Figure 1:
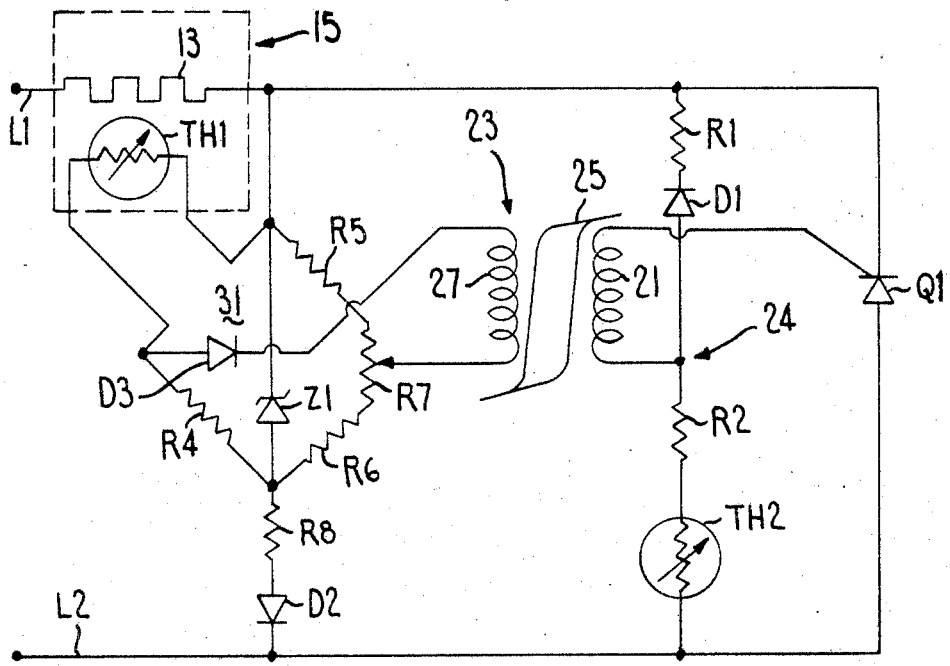

Feb. 11, 1969   F. FINNEGAN   3,427,436

TEMPERATURE CONTROLLER

Filed May 10, 1966

Francis Finnegan,
Inventor.
Koenig, Senniger, Powers and Leavitt,
Attorneys.

United States Patent Office 3,427,436
Patented Feb. 11, 1969

1

3,427,436
TEMPERATURE CONTROLLER
Francis Finnegan, Plainville, Mass., assignor to Texas
Instruments Incorporated, Dallas, Tex., a corporation
of Delaware
Filed May 10, 1966, Ser. No. 549,053
U.S. Cl. 219—501                                                    9 Claims
Int. Cl. H05b 1/02

This invention relates to a temperature controller and more particularly to a temperature controller which exercises proportional control.

Among the several objects of the invention may be noted the provision of a temperature controller which maintains the controlled temperature at a pre-selected level with a very high degree of accuracy; the provision of such a controller which exhibits high gain over a wide band of proportional control; the provision of such a controller which has a rapid response; the provision of such a control which exercises a stable control over a wide range of environmental conditions; the provision of such a controller which itself dissipates relatively little power; the provision of such a controller which is compact; and the provision of such a controller which is relatively simple and inexpensive in construction and reliable in operation. Other objects and features will be in part apparent and in part pointed out hereinafter.

Briefly, a temperature controller of the invention includes means such as a heater which, when energized, varies the temperature in the zone whose temperature is to be controlled. The temperature varying means is energized by A.C. through a triggerable semiconductor switching device which controls the nominal energization of the temperature varying means. A thermistor senses the temperature in the zone. The thermistor is interconnected in a resistance bridge, the unbalance of the bridge being a function of the temperature of the thermistor. A first winding on a saturable magnetic core is interconnected with the bridge in a circuit which magnetizes the core in one direction during A.C. half cycles of one polarity to an extent which is a function of the unbalance of the bridge. A second circuit, which includes a second winding on the core, operates during A.C. half cycles of the opposite polarity to magnetize the core in the opposite direction to an extent which increases with time during those half cycles. The second winding is interconnected with the triggerable semiconductor switching device for triggering the device into conduction after the core saturates, the phase angle at which the device is triggered being a function of the previous magnetization of the core by the first winding. Accordingly, the proportion of time during which the semiconductor device conducts power to the temperature varying means is a function of the temperature of the zone thereby maintaining the zone temperature at a predetermined value.

The invention accordingly comprises the apparatus hereinafter described, the slope of the invention being indicated in the following claims.

Figure 2:
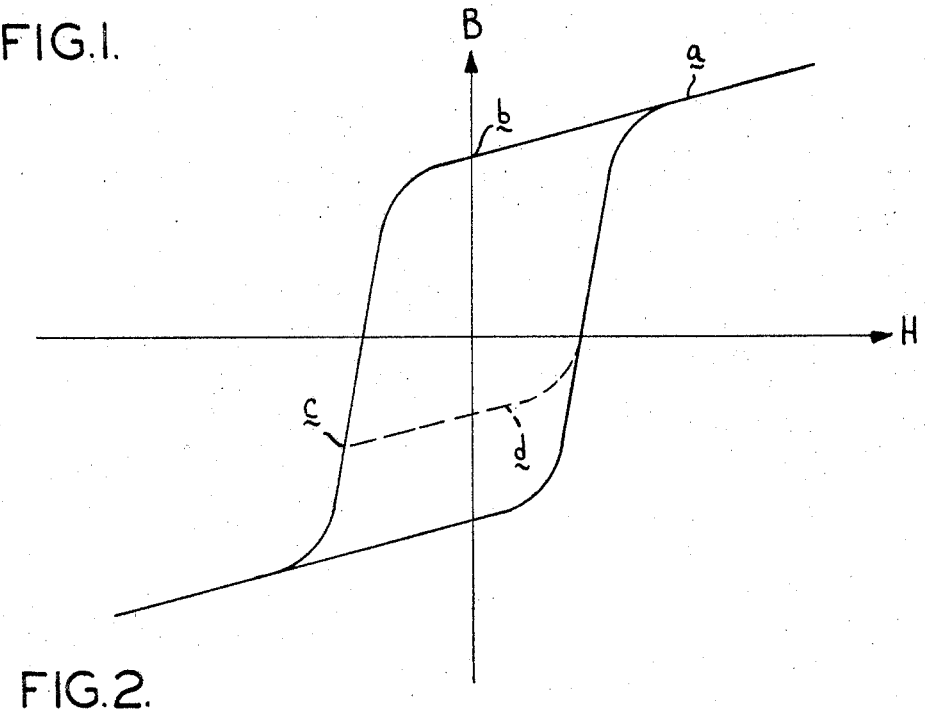

In the accompanying drawings, in which one of various possible embodiments of the invention is illustrated:

FIG. 1 is a schematic circuit diagram of a temperature controller of this invention which controls the energization of a heater to maintain the temperature in a controlled zone at a predetermined level; and FIG. 2 is a graph representing the magnetic behavior of a saturable reactor core employed in the controller of FIG. 1.

Corresponding reference characters indicate corresponding parts throughout the several views of the drawings.

Referring now to the temperature controller shown in FIG. 1, A.C. power, for example at 115 volts and 60

2 c.p.s., is provided to the control circuitry through a pair of lines L1 and L2. The control circuitry is operative to modulate the power supplied to an electric heater 13 for maintaining the temperature within a controlled zone 15 at a preselected level. As explained hereinafter, the control circuitry is responsive to changes in the resistance of an NTC thermistor TH–1 which is adapted to sense the temperature within zone 15.

Heater 13 is provided with half-wave rectified electric power through the anode-cathode circuit of a silicon controlled rectifier (SCR) Q1. The SCR Q1 is a semiconductor current switching device which can be triggered into conduction by current applied to its gate electrode when its anode-cathode circuit is forward biased. Once conduction is initiated, the device remains in conduction until the forward bias is removed by means external to the rectifier.

The power supplied to heater 13 is modulated by varying the firing time or phase angle of the SCR triggering relative to the half cycles of A.C. power during which SCR Q1 is forward biased. By varying the firing time, the proportion of time during which power is supplied to heater 13 is also varied. Triggering current for the gate circuit of SCR Q1 is provided from the gate winding 21 of a saturable triggering reactor 23. The gate winding is biased by a voltage divider 24 which bridges the anode-cathode circuit of SCR Q1 and which includes in series a first resistor R1, a diode D1, a second resistor R2 and an NTC thermistor TH2. Thermistor TH2 is exposed to the ambient temperature in the vicinity of the control circuitry. One end of winding 21 is connected to the divider between diode D1 and resistor R2 and the other end is connected to the gate terminal of SCR Q1.

Saturable reactor 23 includes a magnetic core which possesses so-called square loop hysteresis characteristics. The core having these characteristics is represented in the drawings by the symbol indicated at 25 and the magnetic hysteresis behavior of the core is represented in FIG. 2 by the solid line curves.

Thermistor TH1 is connected as one arm of a resistance bridge 31. A second arm of the bridge is constituted by a resistor R4 and the remaining two arms are each constituted by a respective fixed resistor R5 or R6 and a respective portion of the resistance of a potentiometer R7. The bridge is connected across the anode-cathode circuit of SCR Q1 through a circuit which includes a voltage dropping resistor R8 and a diode D2. Diode D2 is oriented so that bridge 31 is energized alternately with voltage divider 24 on successive half cycles of the A.C. supplied through lines L1 and L2. The voltage applied to the bridge is regulated by a Zener diode Z1.

Saturable reactor 23 also includes a reset winding 27 wound on core 25. Reset winding 27 is connected to bridge 31 for sensing or responding to its unbalance. One end of the reset winding 27 is connected, through a diode D3, to the junction between thermistor TH1 and resistor R4 and the other end is connected to the variable tap of potentiometer R7. Diode D3 in series with winding 27 substantially decouples it from bridge 31 when the winding 21 is being energized so that the reactor is not then loaded by the bridge elements.

The operation of the controller shown in FIG. 1 is as follows, reference being had also to FIG. 2 to illustrate the hysteresis characteristics of the saturable core 25. During those A.C. half cycles which forward bias diode D1, SCR Q1 is triggered by current flowing through winding 21 only after core 25 saturates in the corresponding magnetic direction. Until saturation occurs, the flow of current from divider 24 to the SCR gate electrode is opposed by the inductive reactance voltage developed in winding 21 by the increasing magnetic flux in core 25.

However, after the core saturates, winding 21 exhibits a low impedance and triggering current can flow to the gate of SCR Q1. The rise in current occurs quite abruptly and the time of firing is relatively independent of the characteristics of the SCR. Assuming that SCR Q1 has just been triggered, core 25 will be in a state indicated at $a$ in FIG. 2. At the end of the triggering half cycle, the magnetizing current applied to winding 21 by divider 24 is withdrawn so that the core returns to the state indicated at $b$.

On the half cycles when diode D2 is forward biased, a regulated voltage is applied to bridge 31. Depending upon the temperature of thermistor TH1 and the setting of potentiometer R7, the bridge may or may not be balanced. If the bridge is unbalanced so that the junction between thermistor TH1 and resistor R4 is positive with respect to the variable tap of potentiometer R7, a biasing voltage will be applied to winding 27 and will induce a current flow therein tending to magnetize core 25 in the magnetic direction which is opposite that produced by winding 21. The magnetization produced by the winding 27 is in effect a presetting of the core's magnetization. As is apparent to those skilled in the art, the extent of this presetting magnetization is a function of the resistance of thermistor TH1 and hence also a function of the temperature in zone 15.

Due to the connection of thermistor TH1 in a bridge configuration in which the voltage variations produced by thermistor TH1 in combination with resistor R4 are sensed with reference to a voltage level preselected by adjustment of potentiometer R7 rather than being sensed with reference to ground, relatively small changes in the resistance of the thermistor will produce comparatively large changes in the presetting magnetization of core 25. The absolute values of the components of bridge 31 are chosen in relation to the applied voltage so that, in the temperature range which is to be controlled, the core 25 will not become saturated in the presetting direction but rather will attain only some intermediate magnetization as indicated at $c$ in FIG. 2.

When the applied A.C. then returns to a triggering half cycle during which diode D1 is forward biased, the magnetization of core 25 will behave substantially as represented by the broken line curve designated at $d$ on FIG. 2. As noted previously, the SCR Q1 will not fire until the core 25 is saturated by a current flowing in winding 21, that is, until the core approaches the state indicated at $a$ in FIG. 2. The time required to reach saturation for the given voltage applied to winding 21 depends upon the previous magnetization of core 25 by the winding 27. Thus, this delay is a function of the resistance of thermistor TH1 since that resistance is the factor which largely determines the preset magnetization. Accordingly, variations in the resistance of thermistor TH1 will vary the firing angle of SCR Q1 and thereby modulate the average power supplied to heater 13. Since the SCR operates in a switching mode, very little heat is generated within the control itself. In that the saturation characteristics of reactor 23 may vary with changes in ambient temperature, temperature compensation is provided by means of thermistor TH2 which provides an increased bias voltage to winding 21 at higher ambient temperatures to offset corresponding changes in the magnetic characteristics of core 25.

Thermistor TH1 has a negative temperature coefficient so that, as the temperature in zone 15 increases, the resistant of the thermistor decreases. A decrease in thermistor resistance causes an increase in the preset magnetizing current and thus it also increases the delay which must elapse before firing of SCR Q1 on the triggering A.C. half cycle. An increased delay leaves less time for current to flow through heater 13 during the remainder of the A.C. half cycle and thus the average power to heater 13 is decreased as a result of increasing thermistor temperature. Accordingly, a stable and proportional negative feedback is obtained which maintains the temperature in zone 15 at a predetermined level. Since the bridge connection of thermistor TH1 insures that small changes in its resistance will produce substantial changes in the core preset magnetization as noted previously, the feedback loop possesses high gain and a tight or precise control of temperature is obtained. The particular temperature level which is maintained can be preselected by adjustment of potentiometer P1 to obtain that nominal power flow which gives thermal equilibrium at the desired temperature.

While in the example illustrated, a heater has been used to vary the temperature in the controlled zone, it should be understood that cooling means such as a thermoelectric cooler may also be used to vary the temperature within a controlled zone to an extent which is a function of its energization. Similarly, positive temperature coefficient thermistors may be used and other semiconductor switching devices may be substituted for the SCR shown.

In view of the above, it will be seen that the several objects of the invention are achieved and other advantageous results attained.

As various changes could be made in the above apparatus and methods without departing from the scope of the invention, it is intended that all matter contained in the above description or shown in the accompanying drawings shall be interpreted as illustrative and not in a limiting sense.

What is claimed is:

1. A temperature controller for maintaining the temperature in a zone at a predetermined level, said controller comprising:
   means in heat exchange relationship with said zone for varying the temperature thereof when energized;
   a triggerable semiconductor switching device for switching the flow or power to said means;
   means for supplying A.C. electric power to said means and said semiconductor switching device;
   a thermistor adapted to sense the temperature in said zone;
   resistance means forming with said thermistor a resistance bridge, the unbalance of the bridge being a function of the temperature of said thermistor;
   a saturable magnetic core;
   first circuit means interconnected with said bridge and including a first winding on said core for magnetizing said core in one direction to an extent which is a fuction of the unbalance of said bridge during A.C. half cycles of one polarity; and
   second circuit means including a second winding for magnetizing said core in the opposite direction to an extent which increases with time during A.C. half cycles of opposite polarity, said second winding being interconnected with said semiconductor switching device for triggering said device into conduction after said core saturates, the phase angle at which said device is triggered being a function of the previous magnetization of said core by said first circuit means whereby the proportion of time during which said device conducts varies as a function of the temperature of said zone to maintain the zone temperature at said predetermined level.

2. A controller as set forth in claim 1 wherein said thermistor comprises one of four arms of said resistance bridge.

3. A controller as set forth in claim 2 including a Zener diode connected across said bridge to regulate the input voltage applied thereto.

4. A controller as set forth in claim 2 in which said first winding is connected to said bridge by a circuit which includes a diode for isolating said first winding from said bridge in said A.C. half cycles of opposite polarity.

5. A controller as set forth in claim 2 in which said second circuit means includes a voltage divider connected across said switching device for providing a voltage for biasing said second winding during said A.C. half cycles of said opposite polarity.

6. A controller as set forth in claim 5 in which said voltage divider includes an NTC thermistor for varying the biasing of said second winding in response to variations in ambient temperature thereby to stabilize said control for temperature induced variations in the magnetic saturation point of said core.

7. A controller as set forth in claim 5 in which said second circuit means includes a diode for decoupling said second winding during said A.C. half cycles of said one polarity.

8. A temperature controller for maintaining the temperature in a zone at a predetermined level, said controller comprising:

means in heat exchange relationship with said zone for varying the temperature thereof when energized;
  an SCR in series with said means for switching the flow of power thereto;
  means for supplying A.C. electric power to said means and said SCR;
  a thermistor adapted to sense the temperature in said zone;
  resistance means forming with said thermistor a resistance bridge having four arms one of which includes said thermistor, the unbalance of the bridge being a function of the temperature of said thermistor;
  a saturable magnetic core;
  first circuit means interconnected with said bridge and including a first winding on said core and a diode in series therewith for magnetizing said core in one direction to an extent which is a function of the unbalance of said bridge during A.C. half cycles of one polarity; and
  second circuit means including a second winding on said core and a voltage divider connected across the anode-cathode circuit of said SCR to bias said second winding for magnetizing said core in the opposite direction to an extent which increases with time during A.C. half cycles of opposite polarity, said second winding being interconnected with said SCR for triggering said SCR into conduction after said core saturates, the phase angle at which said SCR is triggered being a function of the previous magnetization of said core by said first circuit means whereby the proportion of time during which said device conducts varies as a function of the temperature of said zone to maintain the zone temperature at said predetermined level.

9. A controller as set forth in claim 8 in which said voltage divider includes an NTC thermistor for varying the biasing of said second winding in response to variations in ambient temperature thereby to stabilize said control for temperature induced variations in the magnetic saturation point of said core.

References Cited
UNITED STATES PATENTS

| 3,240,916 | 4/1966 | Bray et al. | 219—501 |
| 3,202,800 | 8/1965 | Phillips et al. | 219—499 |

BERNARD A. GILHEANY, *Primary Examiner.*

FRED E. BELL, *Assistant Examiner.*

U.S. Cl. X.R.

219—499